United States Patent
Wu

(10) Patent No.: US 8,730,693 B2
(45) Date of Patent: May 20, 2014

(54) CONTROL CIRCUIT OF CHARGE PUMP CIRCUIT FOR ENHANCING EFFICIENCY AND DRIVING CAPACITY

(75) Inventor: Chen-Yu Wu, Yilan County (TW)

(73) Assignee: Winbond Electronics Corp., Taichung (TW)

( * ) Notice: Subject to any disclaimer, the term of this patent is extended or adjusted under 35 U.S.C. 154(b) by 409 days.

(21) Appl. No.: 12/781,165

(22) Filed: May 17, 2010

(65) Prior Publication Data

US 2011/0279102 A1    Nov. 17, 2011

(51) Int. Cl.
*H02M 3/18* (2006.01)
*G05F 1/10* (2006.01)
*G05F 1/00* (2006.01)

(52) U.S. Cl.
USPC ............................... 363/59; 323/266; 327/536

(58) Field of Classification Search
USPC ............. 331/57; 327/536–538, 535; 323/234, 323/265–266; 363/59–60
See application file for complete search history.

(56) References Cited

U.S. PATENT DOCUMENTS

| | | | |
|---|---|---|---|
| 6,300,839 B1 * | 10/2001 | Bazargan et al. | 331/57 |
| 2006/0197583 A1 * | 9/2006 | Yen et al. | 327/536 |
| 2007/0147140 A1 * | 6/2007 | Byeon et al. | 365/189.09 |
| 2008/0088379 A1 * | 4/2008 | Chen | 331/57 |
| 2010/0052771 A1 * | 3/2010 | Hartono | 327/536 |
| 2010/0060343 A1 * | 3/2010 | Saitoh et al. | 327/536 |
| 2010/0308901 A1 * | 12/2010 | Im | 327/536 |

* cited by examiner

*Primary Examiner* — Adolf Berhane
*Assistant Examiner* — Jeffrey Gblende
(74) *Attorney, Agent, or Firm* — J.C. Patents

(57) ABSTRACT

A control circuit of a charge pump circuit is disclosed, which includes a ring oscillator and a load status detection unit. The ring oscillator herein is for producing a clock signal and adjusting the frequency of the clock signal according to a first control signal, and stopping generating the clock signal according to an adjustment signal. The load status detection unit is for producing the first control signal and determining a time point to enable the first control signal according to the voltage drop variation of an output voltage of the charge pump circuit and the adjustment signal, wherein the pulse width of the adjustment signal gets narrower with a smaller drop in amplitude of the output voltage value.

9 Claims, 6 Drawing Sheets

CONTROL CIRCUIT OF CHARGE PUMP CIRCUIT FOR ENHANCING EFFICIENCY AND DRIVING CAPACITY

BACKGROUND OF THE INVENTION

1. Field of the Invention

The present invention generally relates to a control circuit of a charge pump circuit, and more particularly, to a control circuit considering both the efficiency and the driving ability of the charge pump.

2. Description of Related Art

In an electronic apparatus, it is often to require a plurality of source voltages with various voltage levels, so that a charge pump circuit is often disposed to use an available source voltage to produce the source voltages with various voltage levels.

FIG. 1 is a block diagram of a conventional charge pump circuit and the control circuit thereof. The control circuit 100 herein includes a voltage level detector 102 and a ring oscillator 104. The voltage level detector 102 is for detecting the voltage level of the output voltage Vout of the charge pump circuit 106. When the output voltage Vout is less than a constant predetermined voltage level, the voltage level detector 102 outputs a triggering signal S1 to the ring oscillator 104, and the ring oscillator 104 outputs the clock signal P1 according to the triggering signal S1, so that the charge pump circuit 106 pulls the output voltage Vout back to the normal level according to the clock signal P1. In general speaking, when the frequency of the clock signal P1 output by the ring oscillator 104 is high, the driving capacity of the charge pump circuit 106 is better but has a lower efficiency. In contrast, when the frequency of the clock signal P1 output by the ring oscillator 104 is low, the driving capacity of the charge pump circuit 106 is worse but has a higher efficiency. Since the frequency output by the ring oscillator of the conventional charge pump circuit is fixed, so that the circuit design must face a trade off between the driving ability and efficiency of the charge pump circuit according to the application practice; it is not the best of both worlds.

U.S. Patent Application 20060197583 discloses a method to increase the efficiency of a charge pump circuit, where the input frequency of the charge pump is determined by the load amount driven by the charge pump so as to advance the efficiency of the charge pump circuit. The method uses a constant voltage level to decide the frequency conversion of a ring oscillator, so that the scheme of the patent application still fails to obtain a compromise solution between the efficiency of charge pump circuit and the driving capacity. It should be noted that when the output voltage drifts back and fourth about the predetermined voltage level, the ring oscillator would keep switching the frequency so as to low down the efficiency of the charge pump circuit; even the ring oscillator fails to produce the clock signal required during switching the frequency for the charge pump circuit to increase the output voltage. As a result, the output voltage Vout drops down.

SUMMARY OF THE INVENTION

Accordingly, the present invention is directed to a control circuit of a charge pump circuit, which is able to consider both the efficiency and the driving ability of charge pump circuit according to the variation of load status.

The present invention provides a control circuit of a charge pump circuit, which includes a ring oscillator and a load status detection unit, wherein the ring oscillator is coupled to the charge pump circuit and the load status detection unit. The ring oscillator is for producing a clock signal and adjusting the frequency of the clock signal according to a first control signal, and stopping generating the clock signal according to an adjustment signal. The load status detection unit is for producing the first control signal and determining a time point to enable the first control signal according to the voltage drop variation of an output voltage of the charge pump circuit and the adjustment signal, wherein the pulse width of the adjustment signal gets narrower with a smaller drop in amplitude of the output voltage value.

In an embodiment of the present invention, when the output voltage reaches a target voltage level, the ring oscillator ceases producing the clock signal according to the adjustment signal; when the drop in amplitude of the output voltage value gets larger, the load status detection unit would advance the time point to enable the first control signal according to the adjustment signal.

In an embodiment of the present invention, the control circuit of a charge pump circuit includes a voltage level detector, which is coupled to the ring oscillator and the output terminal of the charge pump circuit to detect the voltage drop of the output voltage and thereby produce an adjustment signal.

In an embodiment of the present invention, the above-mentioned load status detection unit includes a bias voltage generation unit and a delay unit, wherein the bias voltage generation unit is coupled to the voltage level detector and the output terminal of the charge pump circuit, and produces a bias voltage according to the output voltage. The delay unit is coupled to the bias voltage generation unit and delays the time point to enable the first control signal according to the bias voltage.

Based on the depiction above, the present invention adjusts the time point to enable the first control signal by means of the pulse width variation of the adjustment signal and the voltage drop variation of the output voltage, which enables the charge pump circuit changing the operation frequency thereof according to the load status, meanwhile, the present invention considers both the efficiency and the driving ability of the charge pump.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
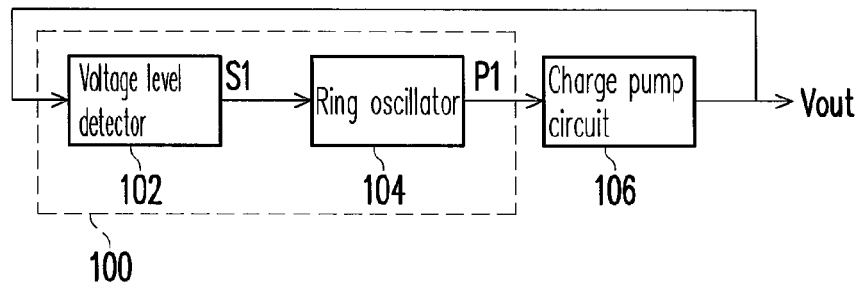
FIG. 1 is a block diagram of a conventional charge pump circuit and the control circuit thereof.

Reference will now be made in detail to the present preferred embodiments of the invention, examples of which are illustrated in the accompanying drawings. Wherever possible, the same reference numbers are used in the drawings and the description to refer to the same or like parts.

Figure 2:
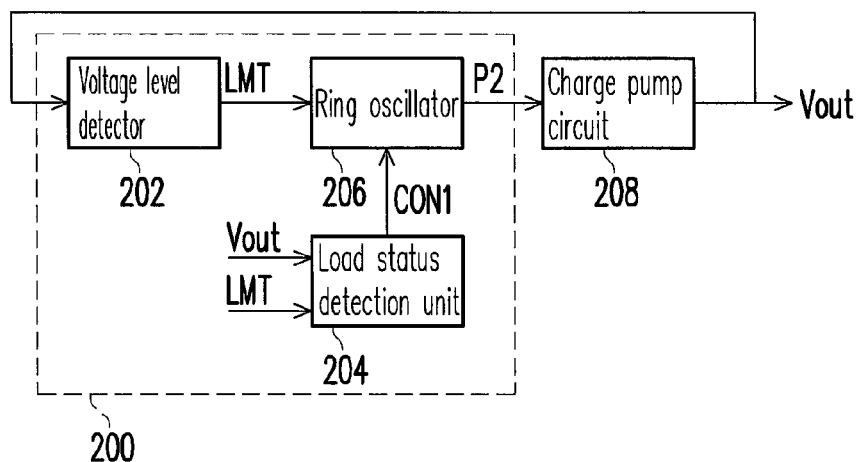
FIG. 2 is a block diagram of a charge pump circuit and the control circuit thereof according to an embodiment of the present invention.

FIG. 2 is a block diagram of a charge pump circuit and the control circuit thereof according to an embodiment of the present invention. Referring to FIG. 2, the control circuit 200 includes a voltage level detector 202, a load status detection unit 204 and a ring oscillator 206. The voltage level detector 202 is coupled to the load status detection unit 204, the ring oscillator 206 and the output terminal of the charge pump circuit 208, while the ring oscillator 206 is coupled to the load status detection unit 204 and the charge pump circuit 208.

The voltage level detector 202 herein is for detecting the voltage drop variation of the output voltage Vout at the output terminal of the charge pump circuit 208 and outputting an adjustment signal LMT according to the voltage drop variation of the output voltage Vout. The load status detection unit 204 is for producing a first control signal CON1 and determining the time point to enable the first control signal CON1 according to the output voltage Vout and the adjustment signal LMT. The ring oscillator 206 adjusts the frequency of the clock signal P2 according to the first control signal CON1. In addition, the charge pump circuit 208 performs boosting a basic voltage according to the clock signal P2, followed by producing the output voltage Vout at the output terminal of the charge pump circuit 208.

For example, when the output voltage Vout drops because of the light load current, and the first control signal CON1 has not been enabled, the clock signal P2 output by the ring oscillator 206 has a lower frequency, so that the charge pump circuit 208 runs in a lower operation frequency; and meanwhile, the charge pump circuit 208 has higher efficiency. When the voltage level of the output voltage Vout is suddenly pulled down (i.e., the load current gets larger), the load status detection unit 204 would adjust the time point to enable the first control signal CON1 according to the drop in amplitude of the output voltage value Vout and the adjustment signal LMT. The larger the drop in amplitude of the output voltage value Vout, the earlier the load status detection unit 204 enables the first control signal CON1 When the first control signal CON1 is enabled, the ring oscillator 206 increases the frequency of the clock signal P2 according to the first control signal CON1, so that the charge pump circuit 208 runs in a higher operation frequency; and meanwhile, the charge pump circuit 208 has enhanced driving capability so as to quickly pull back the output voltage Vout of the charge pump circuit 208 to the normal voltage level. The operation frequency of the charge pump circuit 208 can be adjusted by the control circuit 200 of the embodiment according to the drop in amplitude of the output voltage Vout and the adjustment signal LMT, which considers both the efficiency of the charge pump circuit 208 and the driving capacity and avoids the problem of the prior art which the frequency conversion of the ring oscillator 206 is determined by a fixed voltage level only so that the conventional scheme fails to compromise the efficiency of the charge pump circuit 208 and the driving capacity and even avoids the problem of the prior art which the clock signal P2 constantly switching when the load current occurs constantly so that the output voltage value Vout drops nearby the frequency conversion point and thus the charge pump circuit 208 is unable to obtain the clock signal P2 required to increase the output voltage and thereby low down the output voltage Vout.

Figure 3:
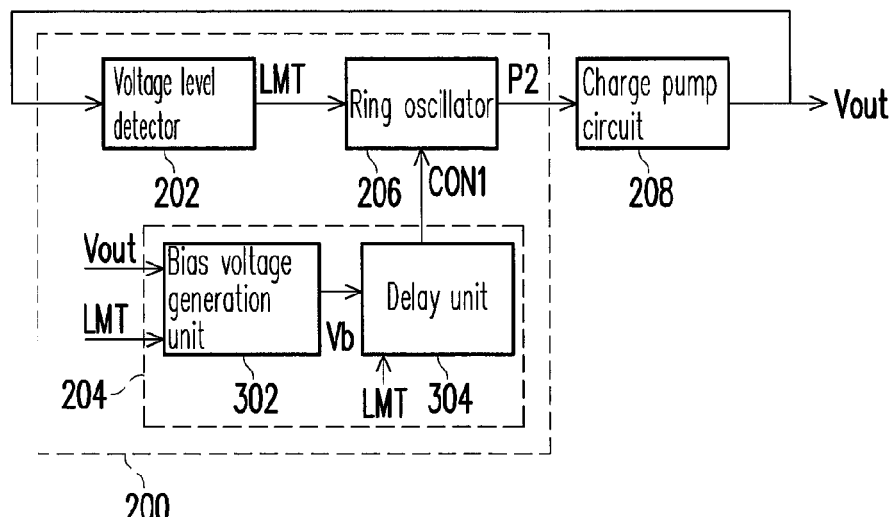
FIG. 3 is a block diagram of a charge pump circuit and the control circuit thereof according to another embodiment of the present invention.

FIG. 3 is a block diagram of a charge pump circuit and the control circuit thereof according to another embodiment of the present invention. Referring to FIG. 3, in the embodiment, the load status detection unit 204 of the embodiment in FIG. 2 includes a bias voltage generation unit 302 and a delay unit 304, wherein the bias voltage generation unit 302 is coupled to the voltage level detector 202, the delay unit 304 and the output terminal of the charge pump circuit 208. The bias voltage generation unit 302 is for detecting the voltage drop of the output voltage Vout of the charge pump circuit 208 and outputting a bias voltage Vb according to the voltage drop of the output voltage Vout. The delay unit 304 produces the first control signal CON1 and delays the time point to enable the first control signal according to the bias voltage Vb and the adjustment signal LMT, wherein when the drop in amplitude of the output voltage value Vout gets larger, the output voltage Vb output by the bias voltage generation unit 302 is larger, and then the delay time that the delay unit 304 enable the first control signal CON1 is shorter. In other words, the larger the drop in amplitude of the output voltage value Vout gets, the quicker the first control signal CON1 is enabled, which increases the frequency of the clock signal P2 to further pull back the output voltage Vout of the charge pump circuit 208 to the normal voltage level.

Figure 4:
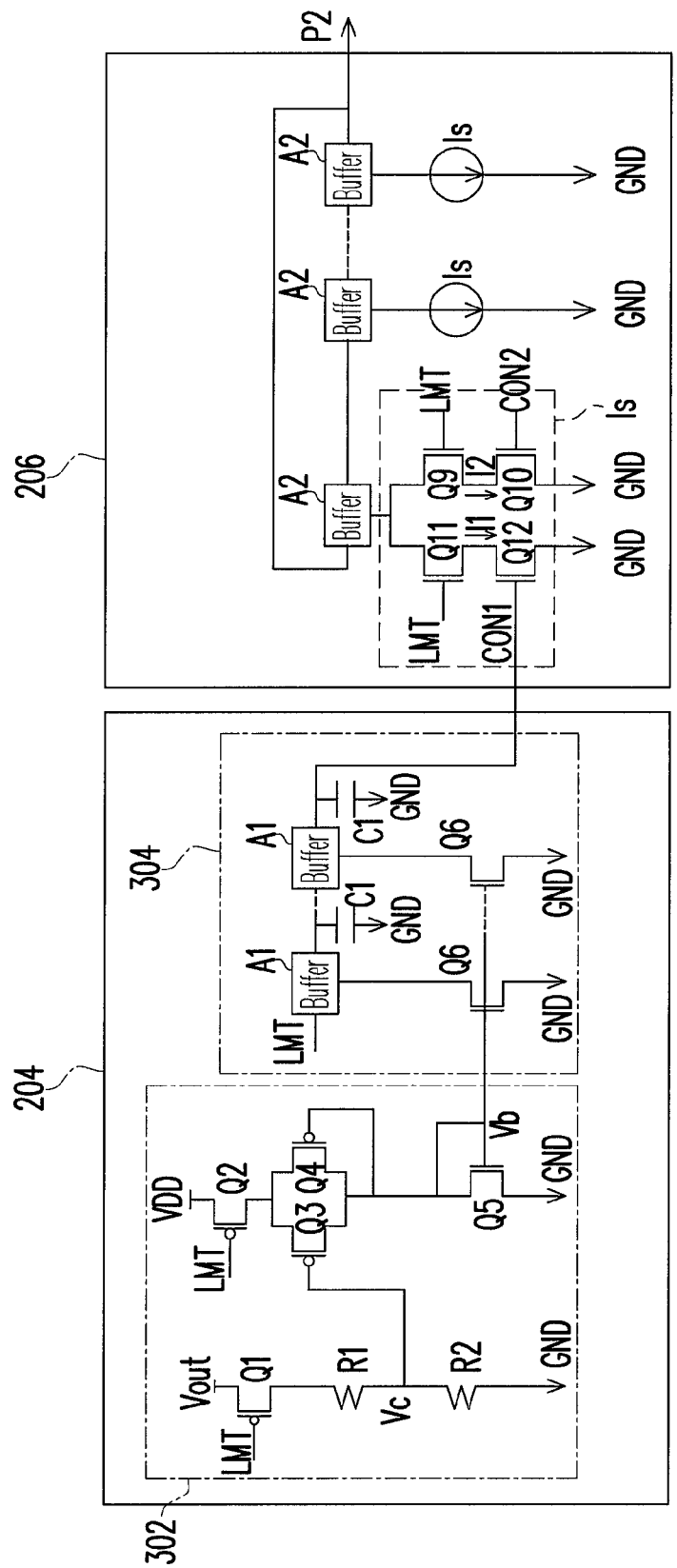
FIG. 4 is a circuit diagram of a load status detector and a ring oscillator according to an embodiment of the present invention.

In more details, the load status detection unit 204 and the ring oscillator 206 in FIG. 3 are shown by FIG. 4. FIG. 4 is a circuit diagram of a load status detector and a ring oscillator according to an embodiment of the present invention. Referring to FIG. 4, the bias voltage generation unit 302 includes transistors Q1-Q5 and two resistors R1 and R2, wherein the first source/drain of the transistor Q1 is coupled to the output voltage Vout, the gate of the transistor Q1 is coupled to the adjustment signal LMT, and the resistors R1 and R2 are connected in series between the second source/drain of the transistor Q1 and a ground terminal GND. The gate and the first source/drain of the transistor Q2 are respectively coupled to the adjustment signal LMT and a source voltage VDD. The second source/drain of the transistor Q2 is coupled to the first source/drains of the transistors Q3 and Q4, wherein the gate of the transistor Q3 is coupled to the common node of the resistors R1 and R2. The first source/drain of the transistor Q4 is coupled to the second source/drain of the transistor Q2, the gate of the transistor Q4 is coupled to the second source/drain of the transistor Q4, while the second source/drain of the transistor Q4 is coupled to the second source/drain of the transistor Q3. The transistor Q5 is coupled between the second source/drain of the transistor Q4 and the ground terminal GND, and the gate of the transistor Q5 is coupled to the first source/drain of the transistor Q5 and the delay unit 304.

The delay unit 304 includes a plurality of buffers A1 in series connection, a plurality of buffer capacitors C1 and a plurality of transistors Q6, wherein the input terminal of the buffers A1 in series connection (i.e., the input terminal of the buffer string formed by the buffers A1) is coupled to the adjustment signal LMT, and the output terminal of the buffers A1 in series connection (i.e., the output terminal of the buffer string formed by the buffers A1) is coupled to the ring oscillator 206. The buffer capacitors C1 are respectively coupled between the output terminal of a corresponding buffer A1 and the ground terminal GND. In addition, the transistors Q6 are respectively coupled between a corresponding buffer A1 and the ground terminal GND wherein the gate of the transistor Q6 is coupled to the bias voltage generation unit 302.

The ring oscillator 206 includes a plurality of buffers A2 and a plurality of current sources Is, wherein the input terminal of the buffers A2 in series connection (i.e., the input terminal of the buffer string formed by the buffers A2) is coupled to the output terminal thereof (i.e., the output terminal of the buffer string formed by the buffers A2). The current sources Is are coupled between a corresponding buffer A2 and the ground terminal GND, wherein the current of each of the current sources Is is controlled by the first control signal CON1 and the second control signal CON2. In the embodiment, each of the current sources Is includes four transistors Q9-Q12, wherein the transistors Q11 and Q12 are connected in series between the corresponding buffer A2 and the ground terminal GND, the transistors Q9 and Q10 are connected in series between the corresponding buffer A2 and the ground terminal GND, the gates of the transistors Q11 and Q9 are coupled to the adjustment signal LMT and the gates of the transistors Q12 and Q10 are respectively coupled to the first control signal CON1 and the second control signal CON2. Prior to enabling the first control signal CON1, the second control signal CON2 controls the clock signal P2 produced by the ring oscillator 206 at a basic frequency, wherein the basic frequency is less than the frequency of the clock signal P2 after enabling the first control signal CON1.

Figure 5A:
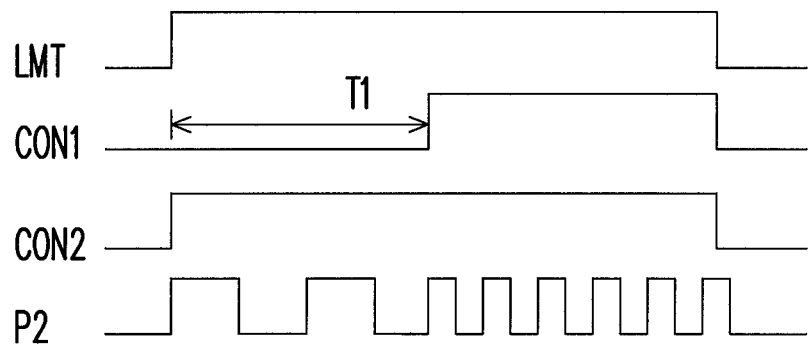
FIGS. 5A-5C are waveform diagrams of an adjustment signal, a control signal and a clock signal according to an embodiment of the present invention.
Figure 5B:
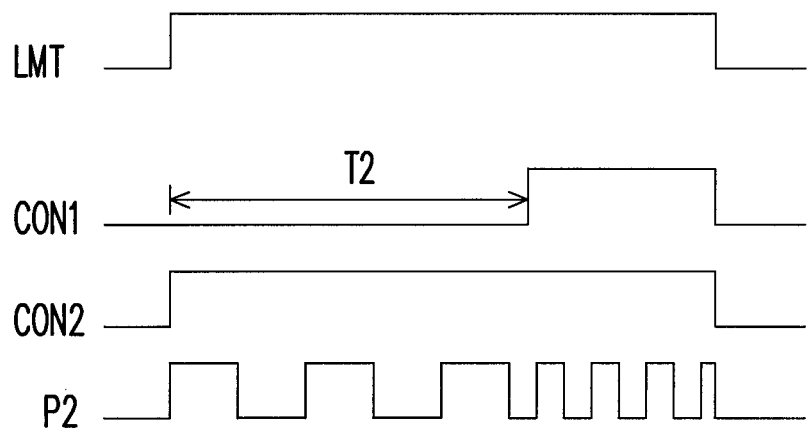
Figure 5C:
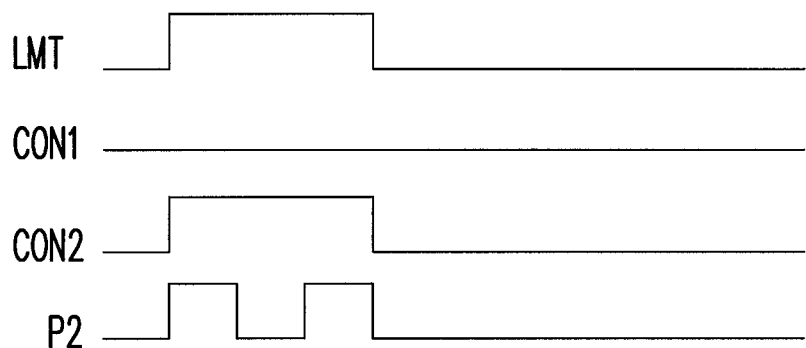

FIGS. 5A-5C are waveform diagrams of an adjustment signal, a control signal and a clock signal according to an embodiment of the present invention, wherein FIG. 5A is a waveform diagram which the charge pump circuit has a larger load current, FIG. 5B is a waveform diagram which the charge pump circuit has a less load current and FIG. 5C is a waveform diagram which the charge pump circuit has a micro load current. In other words, FIGS. 5A-5C are respectively corresponding to that the drop in amplitudes of the output voltage value of the charge pump circuit are sequentially from larger to less.

Referring to FIGS. 3, 4 and 5A, when the output voltage Vout of the charge pump circuit 208 drops by a voltage, the reference voltage Vc at the common node of the resistors R1 and R2 in the bias voltage generation unit 302 (i.e., the gate voltage of the transistor Q3) drops as well, which makes the current of the transistor Q3 larger and further makes the bias current Ib flowing to the transistor Q5 larger (meanwhile, the bias voltage Vb of the gate of the transistor Q5 is increased). Affected by the increased bias voltage Vb of the gate of the transistor Q5, the current flowing through the transistor Q6 in the delay unit 304 gets larger so as to speed up the charge/discharge rate of the buffer capacitor C1, which makes the first control signal CON1 enabled after the output voltage Vout is droping for a duration T1. The transistor Q12 in the ring oscillator 206 turns on the channel the first control signal CON1 is enabled so that the current of the current source Is is increased and equal to a current I1 flowing through the transistor Q12 plus a current I2 flowing through the transistor Q10. During the duration T1 herein, the current of the current source Is is the current I2 flowing through the transistor Q10 and is controlled by the voltage level of the second control signal CON2. It should be noted that the increased current of the current source Is would increase the frequency of the clock signal P2 output by the ring oscillator 206, which provides a larger driving current to pulls back quickly the output voltage Vout of the charge pump circuit 208 to the normal voltage level.

Now referring to FIGS. 3, 4 and 5B, in comparison with the embodiment of FIG. 5A, the charge pump circuit 208 of the embodiment has a less load current so that the decreased reference voltage Vc at the common node of the resistors R1 and R2 is less than the reference voltage Vc of the embodiment of FIG. 5A and the bias current Ib of the embodiment is also less than the bias current Ib of the embodiment of FIG. 5A (i.e., the increased amplitude of the bias voltage Vb is smaller), which make the charge/discharge rate of the buffer capacitors C1 slower than the charge/discharge rate of the charge pump circuit 208 with a larger load current. In this way, the time point to enable the first control signal CON1 would be later than the time point of the embodiment of FIG. 5A (i.e., the duration T2 is greater than the duration T1), and the time point for the ring oscillator 206 to increase the frequency of the clock signal P2 is accordingly later.

Referring to FIGS. 3, 4 and 5C, assuming the charge pump circuit 208 of the embodiment has a micro load current only, since the pulse width of the adjustment signal LMT gets narrower with a smaller drop in amplitude of the output voltage Vout, so that when the pulse width of the adjustment signal LMT gets too narrow, the adjustment signal LMT is filtered out by the delay unit 304 and the first control signal CON1 of the embodiment is unable to be enabled. The current of the current sources Is at the time is the current I2 controlled by the second control signal CON2. The ring oscillator 206 produces the clock signal P2 with the basic frequency according to the current so that the output voltage Vout of the charge pump circuit 208 is pulled back to the normal voltage level. When the output voltage Vout of the charge pump circuit 208 reaches the target voltage level (i.e. reaches the normal voltage level), the adjustment signal LMT turns the level thereof from the high voltage level to the low voltage level and turns off the channels of the transistors Q11 and Q9. Then, the ring oscillator 206 ceases outputting the clock signal P2 so as to maintain the output voltage Vout at the target voltage level.

As depiction above, the time point to enable the first control signal CON1 is adjusted by means of the pulse width variation of the adjustment signal LMT and the voltage drop variation of the output voltage Vout, so that when the load current is larger, the time point to enable the first control signal CON1 is taken in advance; when the load current is smaller, the time point to enable the first control signal CON1 is delayed. In this way, the time point of the operation frequency of the charge pump circuit 208 is changed according to the load status, which is able to consider both the efficiency and the driving ability of the charge pump circuit 208.

Figure 6:
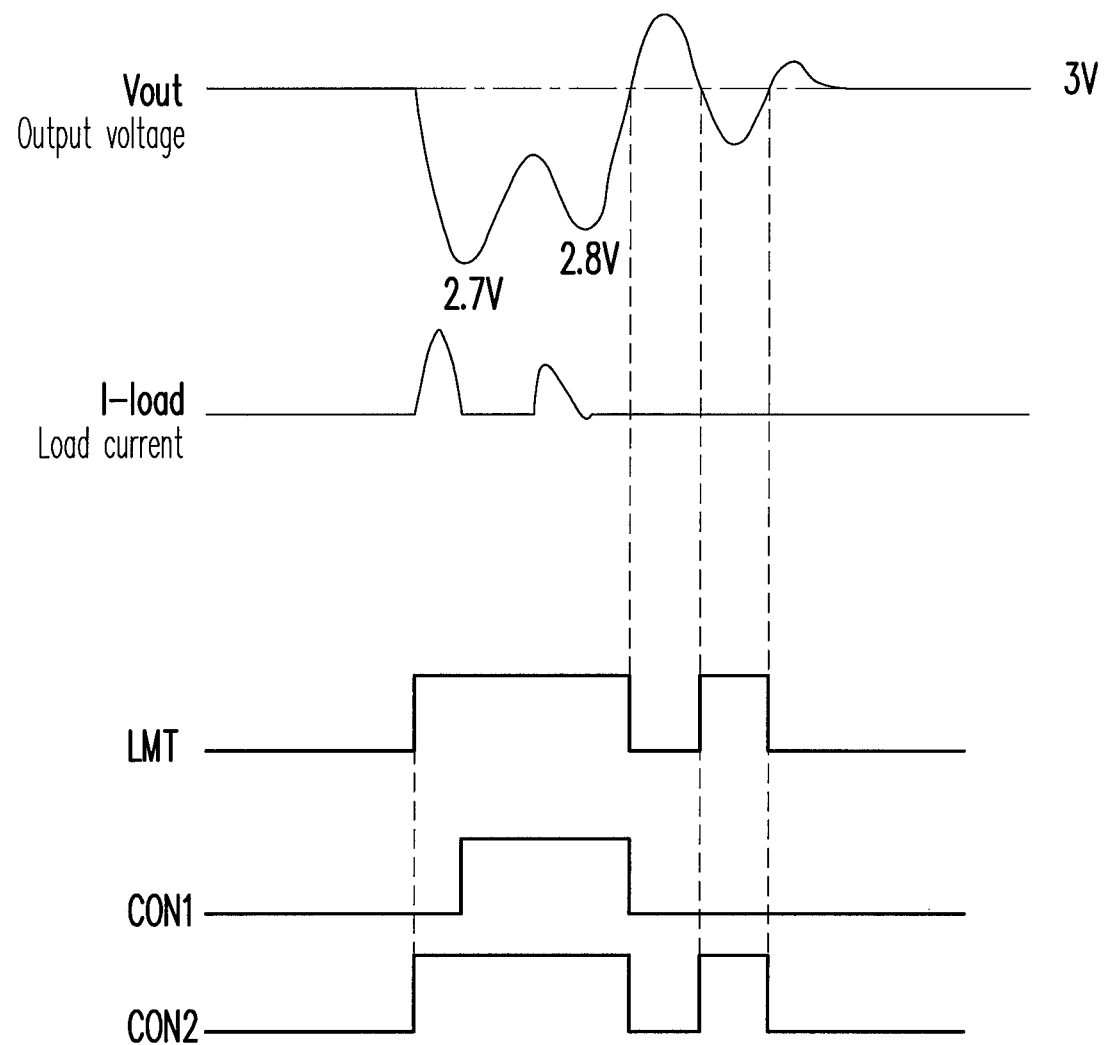
FIG. 6 is a waveform diagram of an output voltage, a load current, an adjustment signal and a control signal according to an embodiment of the present invention.

FIG. 6 is a waveform diagram of an output voltage, a load current, an adjustment signal and a control signal according to an embodiment of the present invention. It can be seen from FIG. 6, when the output voltage Vout of the apparatus in the embodiment is lower than the normal voltage level, the control signal CON1 would not keep switching the voltage level thereof due to the variation of the load current I-load. As a result, the clock signal P2 output by the ring oscillator 206 would not, as the prior art, keep converting the frequency to low down the efficiency of the charge pump circuit too. When the output voltage Vout herein is pulled back to the normal voltage level, the voltage levels of the adjustment signal LMT, the first control signal CON1 and the second control signal CON2 are changed from the high voltage level to the low voltage level. When the output voltage Vout slightly drops by a voltage value from the normal voltage level, the adjustment signal LMT and the second control signal CON2 are changed back to the high voltage level so as to pull back the output voltage Vout to the normal voltage level again.

Figure 7:
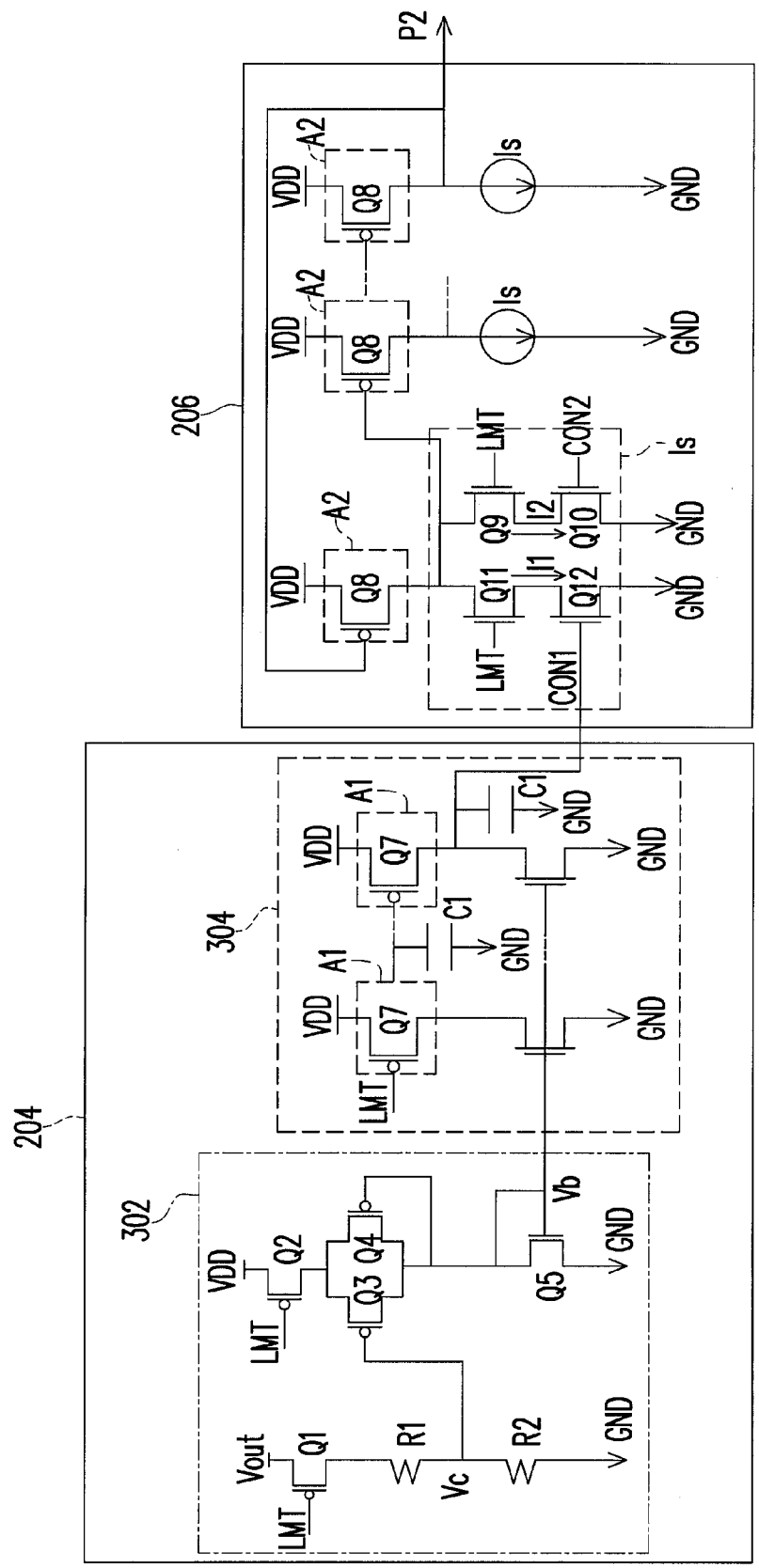
FIG. 7 is a circuit diagram of a load status detector and a ring oscillator according to another embodiment of the present invention.

It should be noted that the buffers A1 and A2 in embodiment of FIG. 4 can be inverters or transistors too. For example, FIG. 7 is a circuit diagram of a load status detector and a ring oscillator according to another embodiment of the present invention. As shown by FIG. 7, the buffers A1 and A2 can be implemented by transistors Q7 and Q8, wherein the gate of the transistor Q7 is the input terminal of the buffer A1, the second source/drain of the transistor Q7 is the output terminal of the buffer A1, and the first source/drain of the transistor Q7 is coupled to the source voltage VDD. In addition, the gate of the transistor Q8 is the input terminal of the buffer A2, the second source/drain of the transistor Q8 is the output terminal of the buffer A2, and the first source/drain of the transistor Q8 is coupled to the source voltage VDD. The operations of the load status detection unit and the ring oscillator are similar to the load status detection unit and the ring oscillator of FIG. 4, which is omitted to describe.

Figure 8:
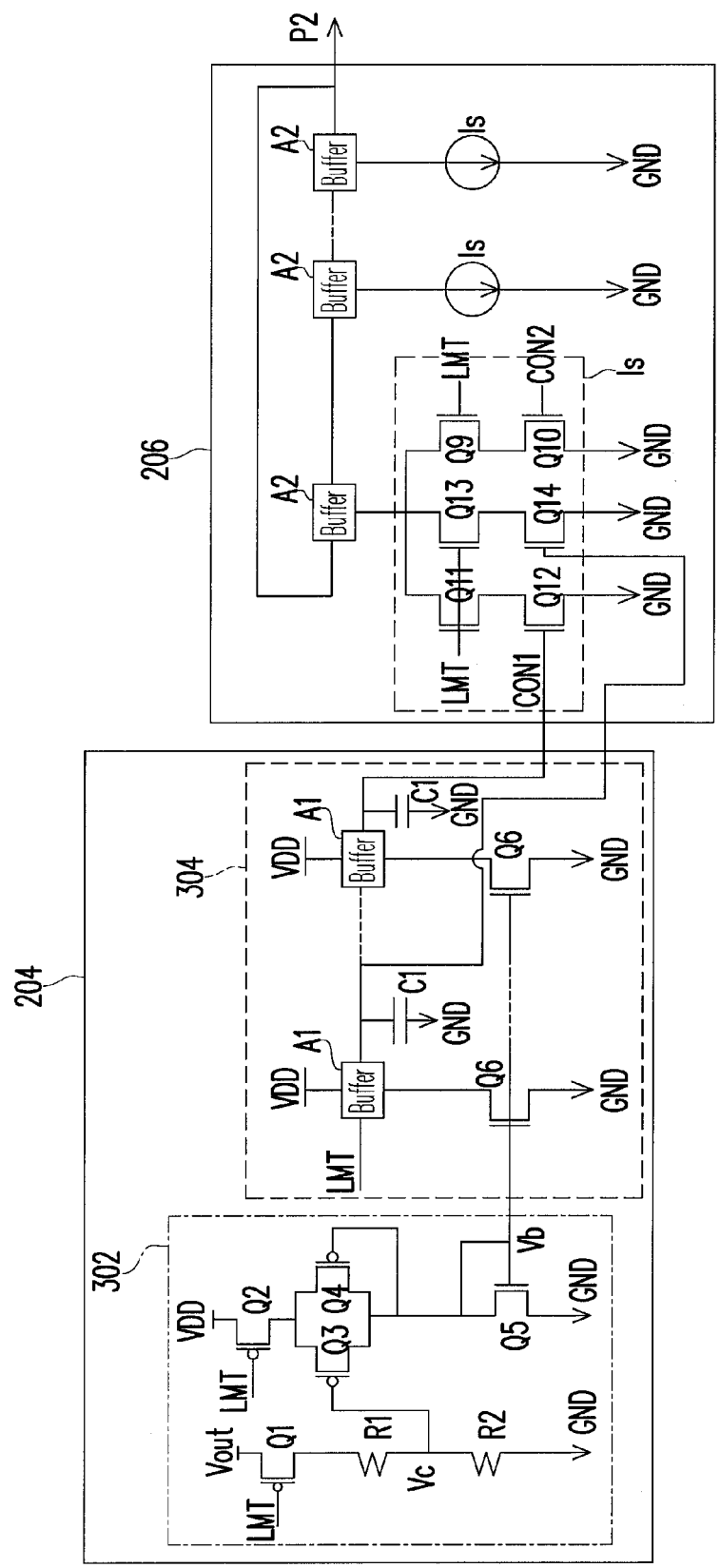
FIG. 8 is a circuit diagram of a load status detector and a ring oscillator according to yet another embodiment of the present invention.

FIG. 8 is a circuit diagram of a load status detector and a ring oscillator according to yet another embodiment of the present invention. Differently from the embodiment of FIG. 4, in the embodiment of FIG. 8, a string composed of the transistors Q13 and Q14 can be additionally disposed in the current source Is, wherein the transistors Q13 and Q14 are connected in series between the buffer A2 and the ground terminal GND, the gate of the transistor Q13 is coupled to the adjustment signal LMT, and the gate of the transistor Q14 is coupled to the output terminal of one of the plurality of buffers A1 (for example, the output terminal of the first buffer A1 in the buffer string). Since the transistors Q12 and Q14 are coupled to the output terminals of different buffers A1, so that the duration of turning on the channels of the transistors Q12 and Q14 are different as well. In this way, the clock signal P2 produced by the ring oscillator 206 has a plurality of different frequencies so that the charge pump circuit 208 has better efficiency and driving capacity with different load current. The operations of the circuits in the embodiment are similar to the circuit of FIG. 4, which is omitted to describe.

In summary, the present invention takes a scheme that the time point to enable the first control signal CON1 is adjusted by means of the pulse width variation of the adjustment signal and the voltage drop variation of the output voltage. When the load current is larger, the first control signal CON1 is enabled in advance; when the load current is smaller, the first control signal CON1 is delayed enabled. As a result, the charge pump circuit 208 is able to adjust the time point of enabling the first control signal to change the operation frequency thereof according to the variation of the load status, which is advantageous in considering both the efficiency and the driving ability of the charge pump circuit 208.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention.

What is claimed is:

1. A control circuit of a charge pump circuit, comprising:
   a ring oscillator, coupled to the charge pump circuit for producing a clock signal and adjusting the frequency of the clock signal according to a first control signal, and stopping generating the clock signal according to an adjustment signal; and
   a load status detection unit, coupled to the ring oscillator for producing the first control signal, directly receiving an output voltage of the charge pump circuit and the adjustment signal, and determining a time point to enable the first control signal according to the voltage drop variation of an output voltage of the charge pump circuit and the adjustment signal, wherein the first control signal is enabled earlier in time to adjust the frequency of the clock signal in response to a greater drop in amplitude of the output voltage value, and wherein the pulse width of the adjustment signal gets narrower with a smaller drop in amplitude of the output voltage value; and
   a voltage level detector, coupled to the load status detection unit, the ring oscillator and the output terminal of the charge pump circuit to detect the voltage drop of the output voltage and to produce the adjustment signal according to the voltage variation of the output voltage of the charge pump circuit.

2. The control circuit as claimed in claim 1, wherein when the output voltage reaches a target voltage level, the ring oscillator ceases producing the clock signal according to the adjustment signal; when the drop in amplitude of the output voltage value gets larger, the load status detection unit advances the time point to enable the first control signal according to the adjustment signal.

3. The control circuit as claimed in claim 1, wherein the load status detection unit comprises:
   a bias voltage generation unit, coupled to the voltage level detector and the output terminal of the charge pump circuit for producing a bias voltage according to the output voltage; and
   a delay unit, coupled to the bias voltage generation unit for producing the first control signal and delaying the time point to enable the first control signal according to the bias voltage.

4. The control circuit as claimed in claim 3, wherein the bias voltage generation unit comprises:
   a first transistor, wherein the first source/drain of the first transistor is coupled to the output voltage and the gate thereof is coupled to the adjustment signal;
   a first resistor;
   a second resistor, together with the first resistor connected in series between the second source/drain of the first transistor and a ground terminal;
   a second transistor, wherein the first source/drain of the second transistor is coupled to a source voltage and the gate of the second transistor is coupled to the adjustment signal;
   a third transistor, wherein the first source/drain of the third transistor is coupled to the second source/drain of the second transistor, and the gate of the third transistor is coupled to the common node of the first resistor and the second resistor;
   a fourth transistor, wherein the first source/drain of the fourth transistor is coupled to the second source/drain of the second transistor, and the second source/drain of the fourth transistor is coupled to the gate of the fourth transistor and the second source/drain of the third transistor;
   a fifth transistor, wherein the fifth transistor is coupled between the second source/drain of the fourth transistor and the ground terminal, while the gate of the fifth transistor is coupled to the first source/drain of the fifth transistor and the delay unit.

5. The control circuit as claimed in claim 3, wherein the delay unit comprises:
   a plurality of first buffers in series connection, wherein the input terminal of the first buffers in series connection is coupled to the adjustment signal, and the output terminal of the first buffers in series connection is coupled to the ring oscillator;
   a plurality of buffer capacitors, respectively coupled between the output terminal of the corresponding first buffer and the ground terminal; and a plurality of sixth transistors, respectively coupled between the corresponding first buffer and the ground terminal and the gate of each of the sixth transistors is coupled to the bias voltage generation unit.

6. The control circuit as claimed in claim 5, wherein each of the first buffers is a seventh transistor, the input terminal and the output terminal of each of the first buffers are respectively the gate and the second source/drain of the seventh transistor, while the first source/drain of each of the seventh transistors is coupled to a source voltage.

7. The control circuit as claimed in claim 1, wherein the ring oscillator comprises:
   a plurality of second buffers in series connection, wherein the input terminal of the second buffers in series connection is coupled to the output terminal of the second buffers in series connection; and
   a plurality of current sources, respectively coupled between the corresponding second buffer and a ground terminal, wherein the current of each of the current sources is controlled by the first control signal and a second control signal.

8. The control circuit as claimed in claim 7, wherein each of the second buffers is an eighth transistor, the input terminal and the output terminal of each of the second buffers are respectively the gate and the second source/drain of the eighth transistor, and the first source/drain of the eighth transistor is coupled to a source voltage.

9. The control circuit as claimed in claim 7, wherein each of the current sources comprises:
   a ninth transistor, wherein the gate thereof is coupled to the adjustment signal;
   a tenth transistor, together with the ninth transistor connected in series between the corresponding second buffer and the ground terminal, wherein the gate of the tenth transistor is coupled to the second control signal;
   an eleventh transistor, wherein the gate of the eleventh transistor is coupled to the adjustment signal; and
   a twelfth transistor, together with the eleventh transistor connected in series between the corresponding second buffer and the ground terminal, wherein the gate of the twelfth transistor is coupled to the first control signal.

* * * * *